Feb. 9, 1932. F. L. PUTNAM ET AL 1,844,073
MAGNETIC GRINDING MACHINE
Filed Aug. 12, 1927
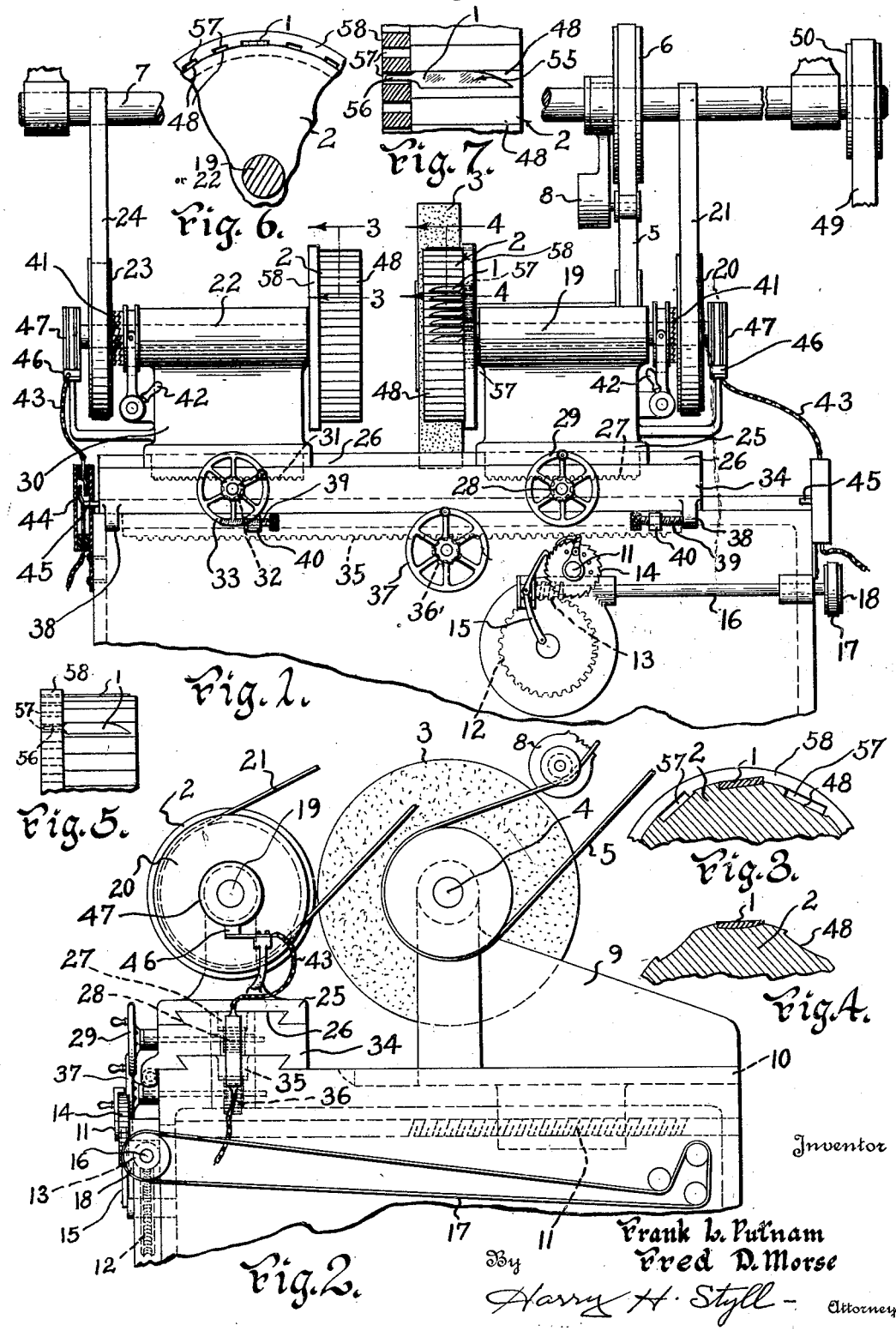
Inventor
Frank L. Putnam
Fred D. Morse
By Harry H. Styll
Attorney Patented Feb. 9, 1932

1,844,073

UNITED STATES PATENT OFFICE

FRANK L. PUTNAM AND FRED D. MORSE, OF SOUTHBRIDGE, MASSACHUSETTS, ASSIGNORS TO HARRINGTON CUTLERY COMPANY, OF SOUTHBRIDGE, MASSACHUSETTS, A CORPORATION OF MASSACHUSETTS

MAGNETIC GRINDING MACHINE

Application filed August 12, 1927. Serial No. 212,490.

This invention relates to an improved process and apparatus for alternately loading and grinding magnetically chucked or held articles, and has particular reference to magnetically chucking and grinding knife blades.

The principal object of the invention is to provide an improved process and apparatus for alternately loading and grinding knife blades on a magnetic chuck whereby the production is greatly increased and the cost of production materially lessened.

Another object of the invention is to provide magnetic chucks with holding facets adapted to position a plurality of knife blades in the true grinding position for each face of the knife blade whereon the knife blades may be simultaneously ground to desired shape.

Another object of the invention is to provide improved means for alternately throwing one chuck into grinding position and the other chuck out of grinding position, whereby one chuck may be grinding while the other is being loaded.

Another object of the invention is to provide means by which a plurality of magnetic chucks may be independently thrown into or out of grinding position.

Another object of the invention is to provide means for automatically throwing out the current that magnetizes the chuck.

Another object of the invention is to provide means for automatically stopping the chucks in grinding position.

Other objects and advantages of the invention will become apparent from the following description taken in connection with the accompanying drawings, and it will be understood that many changes and modifications may be made in the steps of the process, the details of construction and arrangement of parts without departing from the spirit of the invention as expressed in the accompanying claims. We, therefore, do not wish to be limited to the exact details shown and described as the preferred forms only of the invention have been shown by way of illustration.

Referring to the drawings:

Fig. 1 is a front elevation of the machine embodying the invention, a portion of the base thereof being broken away.

Fig. 2 is an end or side view of Fig. 1.

Fig. 3 is a fragmentary view on line 3—3 of Fig. 1 showing the contour of a section of the chuck for holding the article to be ground.

Fig. 4 is a similar view on line 4—4 of Fig. 1 showing the relationship of the article to be ground to the magnetic chuck when the second side of the work is being finished.

Fig. 5 is a fragmentary enlarged view of the face of the chuck in elevation showing holding rims for the end of the work.

Fig. 6 is a side elevation of Fig. 5, and

Fig. 7 is a top or plan view of Figs. 5 and 6.

Referring to the drawings, in which similar characters of reference are used to denote corresponding parts throughout, the articles 1 to be ground, in the present instance knife blades, are laid around the periphery of the magnetic chuck 2 on specially shaped and fashioned holding facets designed to position the work in true grinding position on the periphery of the chuck, and being held thereon in position by magnetic attraction. This invention does not relate per se to the details of construction of the magnetic chuck except in the shaping of the holding facets as hereinafter described. Any usual form of magnetized chuck may be adapted for use in this particular operation when furnished with our special holding facets in the periphery thereof. In the present apparatus there are two magnetic chucks, as shown in Fig. 1, one being aligned with the grindstone 3 and the other out of alignment therewith. The grindstone 3 is mounted on the shaft 4 and is turned by a belt 5 running over the pulley 6 on the power shaft 7. The shaft 4 of the grindstone 3 oscillates longitudinally by means of a cam groove in the shaft and a pin projecting thereinto, details not shown. This oscillates the stone and prevents the articles being ground from following the same path around the stone, which insures an equal wearing on the face of the stone. The slack in the belt 5 is taken up by the weighted idler 8.

The grindstone 3 is mounted on a slide 9 which travels in the slide-way 10 being operated by the feed screw 11, so that it may be moved towards or away from the periphery of the grinding chuck 2. The feed screw 11 is operated by the worm gear 12 meshing with the worm 13 by means of the ratchet 14 and the pawl 15 giving a step by step feed. The worm 13 is turned by the worm shaft 16 and the belt 17 travelling over the pulley 18 which may be coupled up with any available source of power.

From the foregoing it will be seen that the grindstone has a step by step feed towards or away from the periphery of the magnetic chuck 2.

The magnetic chuck 2 on the right hand side of the machine is mounted on the shaft 19 which is turned by the pulley 20 and the belt 21 riding on the power shaft 7. The magnetic chuck 2 on the left hand side is mounted on the shaft 22 which is turned by the pulley 23 and the belt 24 riding over the power shaft 7. The magnetic chuck 2 on the right hand side is mounted on a slide 25 riding on the slide-way 26. The slide 25 has the rack member 27 meshing with the pinion 28, which pinion is turned by the hand wheel 29 to move the slide 25 longitudinally of the machine to align it with or move it out of alignment with the grindstone 3. The magnetic chuck 2 on the left hand side of the machine is similarly mounted on a slide 30 on the slide-way 26 having the rack 31 meshing with the pinion 32 and operated by the hand wheel 33.

From the foregoing description it will be seen that either the right hand or the left hand magnetic chuck 2 may be moved longitudinally on the slide-way 26 to align them with the grindstone or move them out of alignment therewith, these movements being independent of each other. The slide 25 is in turn mounted on another slide 34 which has the rack 35 meshing with the pinion 36 turned by the hand wheel 37. It will be seen, therefore, that both the right and left hand magnetic chucks 2 may be moved together by moving the hand wheel 37 to place one or the other chuck in operative alignment with the grindstone as desired. Each magnetic chuck hence has an independent longitudinal movement as well as a simultaneous movement of the two longitudinally on the base of the machine as respects the face of the grinding wheel.

To automatically position the desired grinding chuck 2 in operative position before the face of the grindstone stops 38 are provided at each end of the slide 34. A screw 39 mounted on the lug 40 of the base is arranged to contact with the stop member 38 so that the proper adjustment may be made in either end of the slide 34. The magnetic chucks 2 are connected with a source of power through the belts 21 and 24 by means of clutches 41 which may be thrown into or out of operation by means of the lever 42 in the usual manner. The magnetic chucks 2 are energized through the electric leads 43 which have the switch connections 44 in line with the contact pins 45. The slide 34 at the end of its motion engages the contact pin 45 and breaks the circuit at the switch 44, thus de-energizing its corresponding magnetic chuck. The details of construction of the switch and leads are shown in section on the left hand side of Fig. 1 and in elevation on the right hand side. The numeral 46 indicates the brushes and the numeral 47 the contact members utilized in transmitting electric energy to the magnetic chuck 2.

Figs. 3 and 4 show in detail the facet 48 on which the knife blades 1 are held for the grinding operation and constitute one of the most important features of our invention. In Fig. 3 the first side to be ground of the article 1 is indicated. It will be noted that the facet 48 is inclined with respect to the periphery of the magnetic chuck 2. This gives the proper angle to the article 1 with regard to the wheel so that the base may be ground to the angle or shape desired. The diameter of the chuck is determined by the shape of the surface to be ground on the work so that there must be a different diameter of chuck used for the various shapes and sizes to be ground. In other words, there is a relationship between the size and shape of the work and the diameter of the holding chuck.

In Fig. 4 the position for grinding the second side of the article 1 is shown. The facet 48 in this instance is curved to fit the under side or first ground side of the article 1. In practice it has been found advantageous to provide the magnetic chuck 2 on the left hand side with one type of facet and the magnetic chuck on the other side with another type of facet so that the first and second sides may be alternately ground, although if desired both magnetic chucks 2 could be of the same type for grinding one side and then another set of the magnetic chucks of the same type for grinding the other side could be used. The power shaft 7 is driven by the belt 49 over the pulley 50 through any desirable source of power.

The operation of the machine has been described above in connection with the mechanical details of construction. The process employed is about as follows: The articles 1 to be ground, as shown in Fig. 1, are mounted on the magnetic chuck 2 in the specially prepared facets. This magnetic chuck 2 is aligned with the grindstone 3 and rotated in relation therewith. This grinds the surface on all of the articles around the magnetic chuck 2 which is in alignment with the grindstone. While the articles 1 on the aligned magnetic chuck 2 are being ground the other magnetic chuck 2 out of alignment is being loaded around its periphery with the blanks of the article 1 to be ground so that when the first magnetic chuck has completed its grinding it can be moved out of alignment with the grindstone and the second magnetic chuck which has been loaded in the meantime is moved into grinding position therewith. Then the second chuck is de-energized, the ground articles removed and it is re-loaded so that when the first chuck has finished its grinding it can be moved out of alignment with the grindstone and the second chuck thrown into alignment therewith and this process carried on for the total time of the grinding. As has been stated above, the two chucks 2 may be thrown into or out of alignment with the grindstone 3 independently of each other on the slide-way 26 or simultaneously on the slide-way 34; when the slide-way 34 is used the stops 38 automatically position the chuck before the grindstone and the contact pins 45 coming in contact with the slide 34 breaks the circuit which de-energizes the chuck that is out of alignment with the stone.

In Figs. 5, 6 and 7 is shown in enlarged fragmentary detail the means of holding the end of the work on the chucks so that it will not lift or become displaced during the grinding operation. In the present instance the work is a plurality of knife blades 1 having the blade portion 55 and the handle or shank portion 56, see Fig. 7. The blade portion 55 lies or rests in or on the facets 48 as has been explained above. The handle or shank portion 56 projects beyond the edge of the chuck 2, being inserted and retained in an opening or recess 57 in a side flange or shoulder piece 58 surrounding the periphery of the chuck 2 on one side thereof. The shanks 56, therefore, anchor the work on the facets and prevent their lifting from or turning on the facets 48 during the grinding operation.

From the foregoing description it will be seen that we have provided simple, economical and efficient means for carrying out the objects of the invention, and particularly that we have provided a simple process for holding and alternately loading and grinding a large plurality of blanks on magnetic chucks, resulting in a considerable saving in time and in greatly increased production with a consequent decrease in cost.

Having described our invention, we claim:

1. In a device of the character described in combination with a rotatable grinding member, a pair of work holding chucks, means for moving said chucks simultaneously and alternately into and out of grinding position, means to move one of the chucks independently into and out of grinding position and means for moving the other chuck independently into and out of grinding position.

2. In a device of the character described in combination with a rotatable grinding member, a pair of work holding chucks, means for moving said chucks simultaneously and alternately into and out of grinding position, means to move one of the chucks independently into and out of grinding position, means for moving the other chuck independently into and out of grinding position, and means for rotating one of the chucks independently and means for rotating the other chuck independently.

3. In a device of the character described in combination with a rotatable grinding member, a pair of magnetic work holding chucks having their axes parallel to the axis of the grinding member, means for simultaneously moving the two chucks longitudinally whereby the desired chuck may be moved into grinding relation with the grinding member and the other chuck out of relation therewith, means on said last named means wherein said chucks may be moved into and out of grinding relation with the grinding member independently of each other, means for de-energizing the chuck that is out of grinding relation with the grinding member, and means for energizing the chuck that is in grinding relation with the grinding member.

FRANK L. PUTNAM.
FRED D. MORSE.